H. H. ELDREDGE.
FRONT WHEEL CONTROL FOR MOTOR VEHICLES.
APPLICATION FILED SEPT. 30, 1916.
1,223,573.
Patented Apr. 24, 1917.
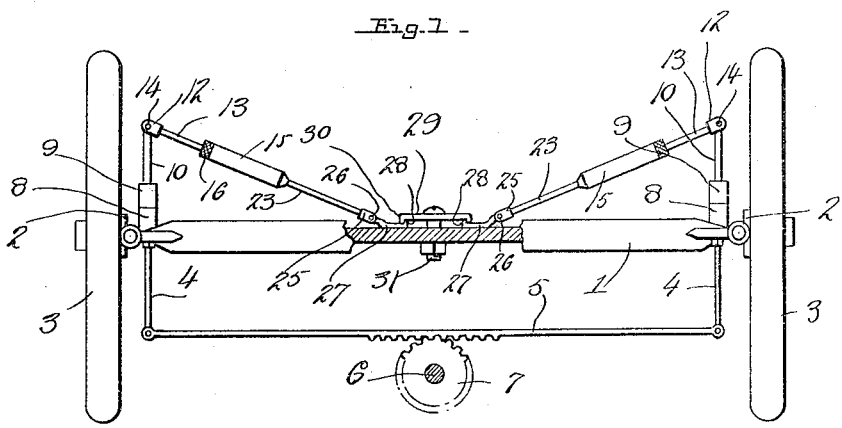
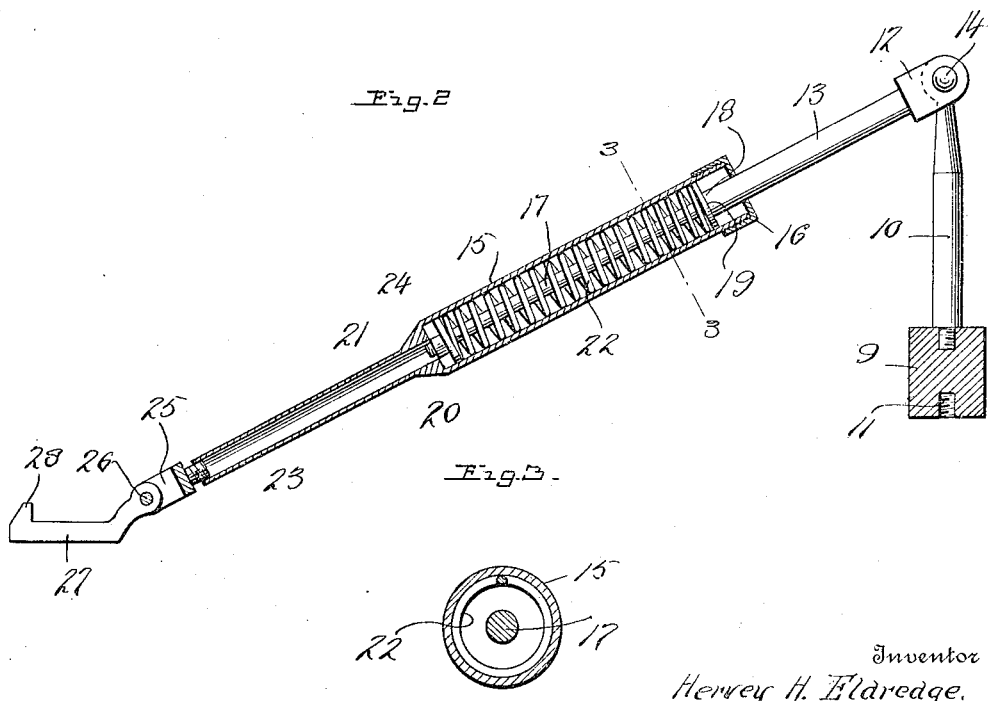
Witnesses
Chas. E. Kemper.
Wm. S. Fowler.
Inventor
Hervey H. Eldredge.
By Richard B. Owen,
Attorney

UNITED STATES PATENT OFFICE.

HERVEY H. ELDREDGE, OF TAYLOR, NORTH DAKOTA, ASSIGNOR OF ONE-HALF TO AUGUST WEGNER, OF TAYLOR, NORTH DAKOTA.

FRONT-WHEEL CONTROL FOR MOTOR-VEHICLES.

1,223,573.          Specification of Letters Patent.          Patented Apr. 24, 1917.

Application filed September 30, 1916. Serial No. 123,169.

*To all whom it may concern:*

Be it known that I, HERVEY H. ELDREDGE, a citizen of the United States, residing at Taylor, in the county of Stark and State of North Dakota, have invented certain new and useful Improvements in Front-Wheel Controls For Motor-Vehicles, of which the following is a specification.

This invention has relation to certain new and useful improvements in a front wheel control for motor vehicles, and has for its primary object the provision of an attachment which may be connected with the steering mechanism for front wheels of motor vehicles and the like to resiliently retain the front wheels in normal position, thereby assuring travel of the vehicle in a straight forward direction.

It is a well known fact that great difficulty is experienced in retaining the front wheels in proper position and preventing the same from carrying the vehicle to first one side and then the other during forward movement of the vehicle. By means of the simple and inexpensive attachment which I provide and connect with the steering mechanism, this difficulty is overcome to a great extent, as the steering knuckles are resiliently retained in normal position and the steering wheel must be operated to permit the front wheels to turn in either direction.

A further object of the invention resides in the provision of a front wheel control of the above stated character which may be applied to motor vehicles of various types without altering the construction of the same and which will be highly efficient in use.

With these and other objects in view, as will appear as the nature of the invention is better understood, the same consists in the novel combination and arrangement of parts hereinafter more fully described, illustrated in the accompanying drawings and pointed out in the appended claims.

In the drawings forming a part of this application and in which like designating characters refer to corresponding parts throughout the several views, Figure 1 is a plan view of the front axle and wheels, as well as the steering mechanism of a motor vehicle of conventional form with my front wheel control applied thereto, Fig. 2 is an elevation of the parts connected with one of the spindles, some of the parts being shown in section, and Fig. 3 is a detail section on the plane of line 3—3 of Fig. 2.

Referring more in detail to the drawings, 1 designates the front axle, 2 the spindles and 3 the front wheels of a motor vehicle of conventional form, the opposite steering rods 4 being connected with the inner ends of the spindles 2 and extended rearwardly, where their rear ends have pivotal connection with the main or transverse rod 5 controlled by the steering column 6 upon which the wheel 7 is mounted. Upon each spindle 2 I provide an extension 8 which projects forwardly and is positioned opposite the rod 4 extended from the same. A block 9 is removably connected with the extension 8 and also with a controlling rod 10, said block 9 having threaded sockets 11 formed in its opposite ends to receive threaded portions of the extension 8 and rod 10. The rod 10 has its outer end pivoted in the bifurcated end 12 of the piston 13 by a suitable pivot pin 14. The rod 13 is extended at an angle from the rod 10 toward the center of the axle 1 and is reciprocally mounted in the cylinder 15, said rod extending through the removable cap 16 provided for the outer end of the cylinder 15. The rod 13 has a reduced inner end 17 within the cylinder 15, thereby providing a shoulder 18 with which is engaged the washer 19 mounted upon the reduced portion 17 and prevented from moving off the end of the same by a stop nut 21. A spring 22 is engaged around the portion 17 and is of such length and tension as to normally exert pressure upon the spaced washers 19 and 20. The cylinder 15 is also provided with a reduced hollow inner end 23, through which the reduced portion 17 and nut 21 may be forced during movement of the spindles 2 with respect to the axle 1. By decreasing the diameter of the inner end of the cylinder 15, I provide a second stop shoulder 24 which prevents movement of the washer 20 into said reduced end 23. The purpose of this construction and arrangement of parts will presently be apparent.

The inner extremity of the cylinder 15 is closed and provided with a bifurcated extension 25 which is connected by a suitable pivot pin 26 to a turned end of the plate 27. The plate 27 is in turn engaged with the outer side of the axle 1 and is provided upon its opposite end with a nose 28.

In order to connect the parts of the front wheel control for the opposite wheels, I provide a plate 29 with flanges 30 formed upon its opposite ends and I secure the plate 29 by a bolt 31 or the like, extended through the axle 1, in such manner as to engage the flanges 30 with the main portions of the plates 27, the nose 28 of each plate being inwardly of one of the flanges 30, thereby preventing movement of the plates 27 upon the axle 1.

From the foregoing, it will be readily seen that the cylinders 15 and pistons 13 are permitted to swing freely upon the plates 27 as the steering mechanism is operated to turn the wheels in either direction and thereby change the vehicle from its straight forward course. This movement of the wheels and turning of the spindles 2 with respect to the axle 1 will cause the rods 10 to force the pistons 13 to move in opposite directions through the cylinders 15, thereby forcing the washers 19 and 20 of the respective pistons 13 toward the opposite ends of the cylinders 15. This will result in compressing the springs 22 at the opposite ends of the cylinders 15. By compressing the springs in this manner, they will be in position to force outwardly one piston 13 and draw inwardly the other piston 13, when the steering wheel 7 is released, automatically returning the spindles 2 to their normal position in alinement with the front axle 1 and the wheels 3 at right angles to said axle 1, and the springs 22 will again hold the spindles 2 in this position and assure a straight forward movement of the vehicle until the steering wheel 7 is again manipulated to change the course.

While the form of the invention described and illustrated is what is believed to be the preferred embodiment of the same, it will be understood that I do not wish to be limited thereto, as minor changes in the details of construction and arrangement of parts may be resorted to within the scope of the appended claims without departing from the spirit of the invention.

I claim—

1. The combination with a transversely shiftable steering rod and a vehicle axle connected therewith, of a plate secured to the axle and having right-angularly extending flanges thereon, plates having lugs thereon having interlocking engagement with the flanges, cylinders carried by the plates, pistons and piston rods movable in the cylinders, connections between the transverse shiftable steering rod and the piston rods, and resilient means mounted in the cylinders and normally urging the piston rods to a position to retain the steering rod in a neutral position.

2. The combination with a transversely shiftable steering rod and a vehicle axle connected therewith, relatively small tubes operatively connected with the axle, relatively large cylinders connected with the tubes, pistons and piston rods movable in the cylinders and tubes, connections between the steering rod and piston rods, and resilient means mounted in the cylinders and normally retaining the steering rod in a position to cause the vehicle to travel in a forward path.

3. The combination with a transversely shiftable steering rod, and a vehicle axle connected therewith, of cylinders operatively connected therewith and extending in divergent directions from the same, pistons and piston rods movable in the cylinders, rods connected with the ends of the axle and extending forwardly of the same and having pivotal connection with the outer extremities of the piston rods, and expansible means mounted in the cylinders and normally urging the piston rods to a position to retain the steering rod in its normal position.

4. The combination with a transversely shiftable steering rod and a vehicle axle connected therewith, a plate mounted thereon and having inwardly extending flanges, plates lying against the axle and having lugs thereon having interlocking engagement with the flanges, tubes pivotally connected with the plates, cylinders carried by the tubes, pistons and piston rods movable in the cylinders, rods extending forwardly from the axle and having pivotal connection with the piston rods, and means in the cylinders for normally urging the piston rods to a position to retain the steering rod in its normal position.

5. The combination with a transversely shiftable steering rod and a vehicle axle connected therewith, of cylinders mounted in the axle and extending in a horizontal plane and in divergent relation, pistons and piston rods mounted in the cylinders, forwardly extending rods connected with the axle and pivotally connected in the outer extremities of the piston rods, and coil springs mounted in the cylinders and bearing against the pistons where upon shifting the steering rod in one direction, one of the springs will be compressed and return the steering rod to its initial position.

In testimony whereof I affix my signature in presence of two witnesses.

HERVEY H. ELDREDGE.

Witnesses:
C. J. McWOLD,
CHARLES HOWE.